(12) United States Patent
Kratsko

(10) Patent No.: US 10,670,739 B2
(45) Date of Patent: Jun. 2, 2020

(54) GAMMA RADIATION AND NEUTRON RADIATION DETECTOR

(71) Applicant: Polimaster Holdings Corporation, Sterling, VA (US)

(72) Inventor: Aliaksandr Kratsko, Minsk (BY)

(73) Assignee: Polimaster Holdings Corporation, Sterling, VA (US)

( * ) Notice: Subject to any disclaimer, the term of this patent is extended or adjusted under 35 U.S.C. 154(b) by 0 days.

(21) Appl. No.: 16/214,404

(22) Filed: Dec. 10, 2018

(65) Prior Publication Data

US 2020/0025951 A1    Jan. 23, 2020

(30) Foreign Application Priority Data

Jul. 17, 2018    (BY) .................................. A20180350

(51) Int. Cl.
*G01T 1/20* (2006.01)
*G01T 3/06* (2006.01)

(52) U.S. Cl.
CPC ............ *G01T 1/2008* (2013.01); *G01T 3/065* (2013.01)

(58) Field of Classification Search
CPC .............................. G01T 1/2008; G01T 3/065
See application file for complete search history.

(56) References Cited

U.S. PATENT DOCUMENTS

| | | |
|---|---|---|
| 5,481,114 A | 1/1996 | Daniel et al. |
| 7,335,891 B2 | 2/2008 | Kniss et al. |
| 9,029,784 B1 | 5/2015 | Mathur |
| 9,864,074 B1 * | 1/2018 | Newman ................ G01T 1/2907 |
| 2009/0140150 A1 * | 6/2009 | Ivan ........................ G01T 1/1642 250/361 R |
| 2011/0291814 A1 | 12/2011 | Kusner |

(Continued)

FOREIGN PATENT DOCUMENTS

| | | |
|---|---|---|
| BY | 8153 U | 10/2011 |
| EP | 2597498 A1 | 5/2013 |

(Continued)

OTHER PUBLICATIONS

Search report in PCT/BY2019/000010, dated Dec. 11, 2019.

*Primary Examiner* — Hugh Maupin
(74) *Attorney, Agent, or Firm* — Bardmesser Law Group

(57) ABSTRACT

A photomultiplier simultaneously detects gamma and neutron radiation. The detector includes an external scintillator sensitive to neutron radiation, which is optically coupled to an internal scintillator sensitive to gamma radiation; a solid-state silicon photomultiplier capable of simultaneously registering optical signals from both the external scintillator and internal scintillator, and of transforming the signals into electrical pulses; and a signal processing unit. The external scintillator is a lamination/paint or film. The entire surface of the internal scintillator is covered, except for an area that is adjacent to the input window of the solid-state silicon photomultiplier. The signal processor includes a preamplifier, a spectrometric amplifier, and a pulse shape analyzer. The photomultiplier has improved neutron sensitivity due to the external scintillator covering almost the entire edge surface of the internal scintillator. A solid-state silicon photomultiplier reduces size and power consumption, and improves resistance to mechanical and magnetic impacts.

16 Claims, 2 Drawing Sheets

(56) References Cited

U.S. PATENT DOCUMENTS

| | | | | |
|---|---|---|---|---|
| 2015/0307777 A1* | 10/2015 | Fukuda | ................... | G01T 3/06 |
| | | | | 250/390.11 |
| 2015/0378031 A1* | 12/2015 | Stowe | ................... | C30B 11/06 |
| | | | | 250/361 R |
| 2018/0172852 A1 | 6/2018 | Newman et al. | | |
| 2018/0329089 A1* | 11/2018 | Bloser | ................... | G01T 1/29 |

FOREIGN PATENT DOCUMENTS

| | | |
|---|---|---|
| JP | 6122266 B2 | 1/1986 |
| RU | 2088952 C1 | 8/1997 |
| RU | 2158011 C2 | 10/2000 |
| RU | 2300782 C2 | 2/2007 |
| WO | 2016144403 A3 | 9/2016 |

* cited by examiner

GAMMA RADIATION AND NEUTRON RADIATION DETECTOR

CROSS REFERENCE TO RELATED APPLICATIONS

This application claims priority to Belorussian Patent Application No. a20180350, filed on Jul. 17, 2018, which is incorporated herein by reference in its entirety.

BACKGROUND OF INVENTION

Field of Invention

The present invention relates to the field of simultaneous detection of gamma radiation and neutron radiation sources, and can be implemented across various industries (e.g., medicine or security), particularly as a part of detectors used to monitor radiation (e.g., to prevent unauthorized relocation of nuclear or radioactive materials) or to monitor sources of radioactivity.

Description of the Related Art

Current gamma radiation and neutron radiation detectors operate using scintillators, which are materials that exhibit scintillation, the property of luminescence, i.e. light emission, when excited by ionizing radiation (gamma quanta, electrons, a particles, etc.). As a rule, the number of photons being emitted for any given radiation type is approximately proportionate to the amount of energy absorbed, which allows calculating the energy spectrum of the radiation. The light that has been emitted by the scintillation effect is accumulated by a photodetector inside the scintillation-based detector; then, it is transformed into an electrical pulse which is then amplified and recorded by some registration system. Scintillators may be either organic (such as crystals, plastics, or liquids) or non-organic (such as crystals or glasses). Gaseous scintillators may also be used. Conventional gamma radiation and neutron radiation detectors usually comprise a sensor and an electronic signal processing unit.

There is a known a detector of ionizing radiation, neutrons and gamma quanta, comprising a sensor and an electronic signal processing unit equipped with a scintillation selection circuit, wherein slow and fast neutrons are detected against the concomitant gamma radiation with the help of three scintillators that are connected both in parallel and in series, namely: an external neutron scintillator made of a plastic-based hydrogenous substance $(CH)_n$ that is sensitive to fast neutrons or of stilbene; a NaI(Tl) (sodium iodide) scintillator that is sensitive to gamma radiation, placed inside the well of the external scintillator; an internal glass scintillator that is sensitive to thermal neutrons; and a photomultiplier tube—all placed in the same enclosure, wherein the electronic signal processing unit additionally includes a spectrometric scintillation analyzer that analyzes scintillations produced by the NaI(Tl) scintillation crystal. The external hydrogenous scintillator thickness should be sufficient to slow down the fast neutrons passing through it to thermal-level energies. The internal scintillator that is sensitive to thermal neutrons is made of cerium-activated lithium silicate glass containing the $^6Li$ isotope in the amount of up to $10^{22}$ $cm^{-3}$, that should be enough to effectively detect thermal neutrons [1].

The drawback of this detector is its insufficient reliability because it is difficult to ensure proper optical coupling of three scintillators that are connected both in parallel and in series, as well as its high cost.

There is another known scintillation detector of neutron radiation and gamma radiation comprising a sensor, which includes an external neutron scintillator made of a plastic-based hydrogenous substance $(CH)_n$ that is sensitive to fast neutrons or of stilbene, an internal NaI(Tl) scintillator that is sensitive to gamma radiation, placed inside the well of the external scintillator, a photomultiplier tube, and an electronic signal processing unit, which includes a temporal selection circuit and a spectrometric scintillation analyzer—all placed in the same enclosure. Additionally, the sensor includes two sleeves made of boron-containing material for conducting the (n, α, γ) reaction, wherein the first sleeve houses the external organic scintillator, and the second sleeve, placed inside the well of the external scintillator, houses the container of the internal NaI(Tl) scintillator. The boron-containing material for sleeves is one of boron nitride or boron carbide, wherein the sleeve thickness should be sufficient to fully absorb thermal neutrons [2].

The drawback of this detector is that it is large, has high power consumption, has too many signal processing channels that increase the signal processing time, and also has considerable production cost.

Also known is a radiation detector capable of detecting both gamma radiation and neutron radiation, the detector comprising a radiation-sensitive element, a first scintillator that is sensitive to gamma radiation, a second scintillator that is sensitive to neutrons, and a photodiode; wherein the first scintillator is directly connected to the photodiode, while the second scintillator is connected to the photodiode through a wavelength-shifting material. The first scintillator is made of a lanthanum halide-based material. The second scintillator scintillates in the range of 300-500 nm. The second scintillator structure prevents it from exciting the first scintillator as well as from being excited by the first scintillator. The wavelength-shifting material comprises wavelength-shifting fibers [3].

The drawback of this solution is that the resulting detector is large, has high power consumption and considerable cost.

Currently, there is a growing need for practical, high-resolution detectors of gamma radiation and neutron radiation. It is also desirable that such apparatuses be portable or compact.

SUMMARY OF INVENTION

An object of the present invention is to create a portable gamma radiation and neutron radiation detector that is resistant to mechanical and magnetic impacts and eliminates the problems described above.

A gamma radiation and neutron radiation detector includes an internal scintillator made of a high atomic number material for detecting to gamma radiation; an external scintillator made of a low atomic number material that converts neutron radiation into charged particles through (n-p), (n-α), or (n-$^3$H) reactions, the external scintillator being optically coupled to the internal scintillator and surrounding the internal scintillator completely except for one edge; a solid-state silicon photomultiplier coupled to the edge, the solid-state silicon photomultiplier simultaneously registering optical signals from the external scintillator and the internal scintillator, and transforming the optical signals into electrical pulses; and a signal processing unit receiving the electrical pulses; wherein the signal processing unit comprises a preamplifier, a pulse shape analyzer and a spectrometric shaper/amplifier. The preamplifier amplifies the electrical pulses form the solid-state silicon photomultiplier; the pulse shape analyzer separates electrical pulses due to the external scintillator from electrical pulses due to the internal scintillator, and outputs a count corresponding to the neutron radiation; the spectrometric shaper/amplifier converts the electrical pulses due to the internal scintillator into Gaussian-shaped pulses and outputs an analog signal due to the gamma radiation. Neutron radiation signals and gamma radiation signals are separated using a pulse shape discrimination method.

The external scintillator that is sensitive to neutron radiation is made of one of a composite, a non-organic, or an organic material. In an exemplary embodiment of the present invention, the composite material is one of LiF/ZnS:(Ag, Cu, Ni), $B_2O_3$/ZnS:(Ag, Cu, Ni), ($B_2O_3$+KCl)/ZnS:(Ag, Cu, Ni), or LiF/ZnO:Zn; the non-organic material is one of LiI:Eu, $LiI_xNa_{1-x}$:Eu, $LiCaAlF_6$:(Eu, Na), $LiSrAlF_6$:Eu, or $Li_2Se$:Ag; and the organic material is stilbene. In an exemplary embodiment, the internal scintillator is made of one of $CeF_3$, BGO, YAP:Ce, or YSO:Ce.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
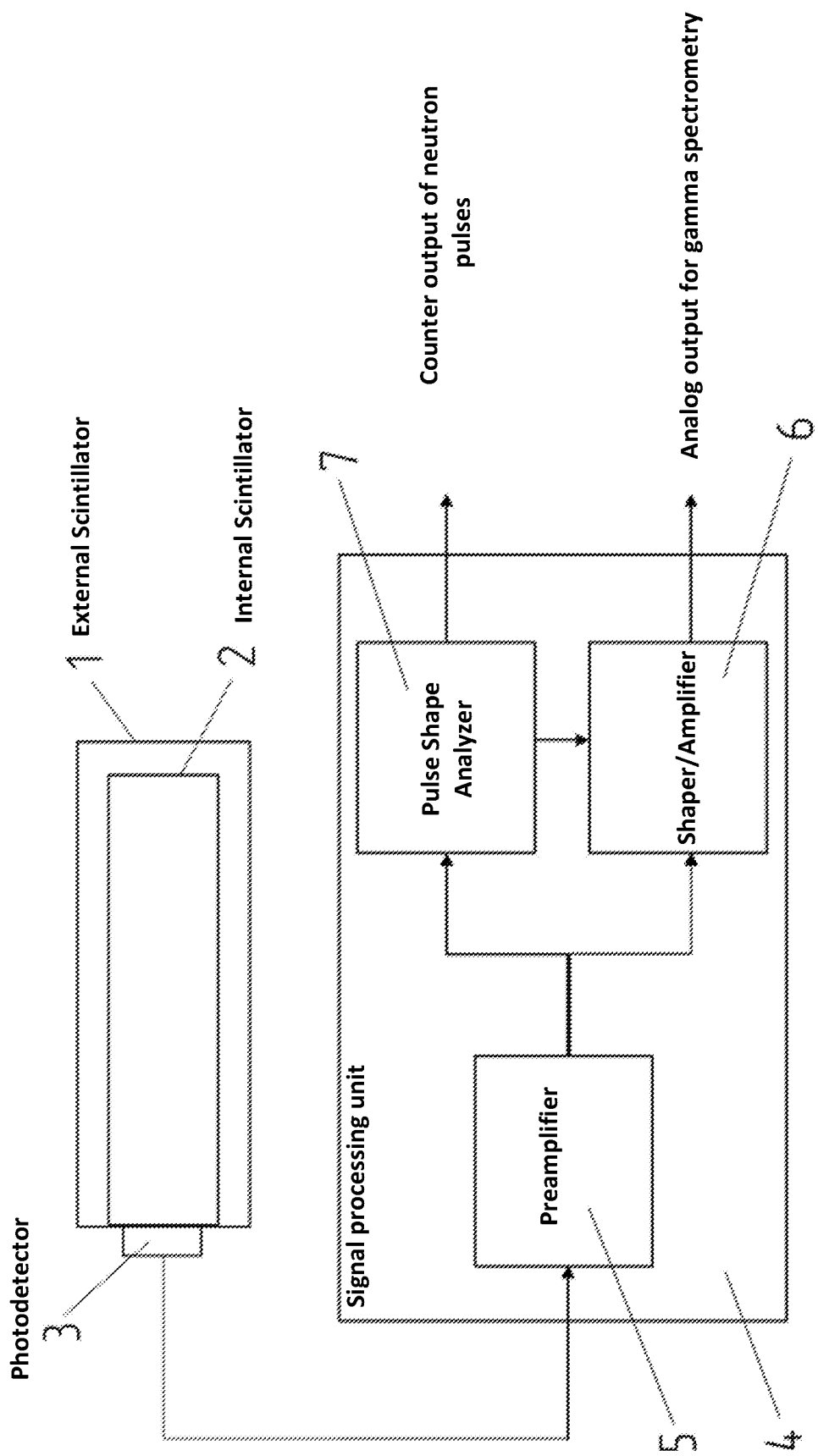
FIG. 1 illustrates an exemplary detector of the present invention.

The claimed solution is further defined by FIG. 1, which is a schematic diagram of the gamma radiation and neutron radiation detector according to the present invention, and by the following description.

The gamma radiation and neutron radiation detector comprises: a sensor equipped with an external scintillator 1 that is sensitive to neutron radiation, which is optically coupled to an internal scintillator 2 that is sensitive to gamma radiation; a photodetector 3 capable of simultaneously registering optical signals from both the external scintillator 1 and internal scintillator 2, and of transforming said signals into electrical pulses of various shapes; and a signal processing unit 4. The external scintillator 1 is made of a low atomic number material (i.e., including lithium or boron, in some cases Gd, typically with Z<20) including an element with a larger neutron cross section that converts neutron radiation into charged particles through (n-p), (n-α), (n-$^3$H) reactions, and the internal scintillator 2 is made of a high atomic number material (e.g., $CeF_3$, BGO, YAP), with Z typically >50.

The external scintillator 1 is placed over the internal scintillator 2 as a lamination, paint or film covering the entire surface of the internal scintillator 2, except for an area that is adjacent to the input window of the photodiode 3—specifically, a solid-state silicon photomultiplier. The solid state PMT is usually square in most commercially available examples, and the internal scintillator is therefore shaped as a "stick" that is roughly square in cross-section.

The signal processing unit comprises a preamplifier 5, a spectrometric pulse shaper/amplifier 6, and an pulse shape analyzer 7. The preamplifier 5 generates a signal amplitude that is necessary for the spectrometric pulse shaper/amplifier 6 and the pulse shape analyzer 7 to function. The pulse shape analyzer 7 separates the signals produced by the external scintillator 1 from those produced by the internal scintillator 2. The spectrometric pulse shaper/amplifier 6 takes the electrical pulses corresponding to signals from the internal scintillator 2 that is sensitive to gamma radiation, and converts them to a more Gaussian shaped signal (since the original pulses based on the gamma radiation often have very sharp rising edges, making estimates of the amplitude difficult), while neutron radiation signals and gamma radiation signals are separated using a pulse shape discrimination method.

The claimed gamma radiation and neutron radiation detector is designed to operate in mixed gamma-and-neutron fields. Gamma radiation, typically to a sensitivity of down to a single gamma photon, which can be converted to on the order of about 1000 visible light photons, is detected by the internal scintillator 2 that is made of materials providing effective enough detection of gamma quanta while keeping the absorption of the stream of neutrons to a minimum. Also, scintillation kinetics of the internal scintillator 2 are typically much shorter than the scintillation decay time of the external scintillator 1 that detects neutron radiation (although in some cases the decay times of the internal scintillator can be longer). Generally, the shape of the neutron signal should be as different as possible from the shape of gamma signal, in order to make their separation easier using the pulse shape discrimination method.

The external scintillator 1 provides effective enough detection of neutrons while keeping the absorption of gamma quanta to a minimum. Separation of gamma radiation from neutron radiation by the shapes of their corresponding pulses is made possible due to a significant difference in the scintillation decay times of the external scintillator 1 and the internal scintillator 2. The pulses from the external scintillator (neutron radiation detection) are usually on the order of microseconds, and the internal scintillator (gamma radiation detection) produces pulses on other order of hundreds of nanoseconds (although the exact numbers depend heavily on the materials chosen—the important thing is that they be different, to enable discriminating among them). Optical signals produced by the external scintillator 1 and the internal scintillator 2 are registered by the solid-state silicon photomultiplier 3.

The preamplifier 5 receives the signal from the photomultiplier 3 and outputs a signal amplitude that is necessary for the spectrometric pulse shaper/amplifier 6 and the pulse shape analyzer 7 to function. The pulse shape analyzer 7 separates the signals produced by the external scintillator 1 from those produced by the internal scintillator 2 based on a significant difference between the shapes of their corresponding pulses (i.e., using a pulse shape discrimination technique known in the art). The spectrometric pulse shaper/amplifier 6 shapes the incoming signals from the internal scintillator 2 into Gaussian-shaped signals or trapezoid-shaped signals.

When the unit is exposed to a mixed gamma-and-neutron radiation, neutrons are largely absorbed by the external scintillator 1. Due to a smaller neutron cross section of the internal scintillator 2, the stream of neutrons barely interacts with the internal scintillator 2. Gamma radiation, in turn, penetrates the external scintillator 1 with almost no interaction—mainly because the external scintillator 1 is thin—to be absorbed by the internal scintillator 2.

The external scintillator is made of a composite, a non-organic, or an organic material. In an exemplary embodiment of the present invention, the composite material is one of LiF/ZnS:(Ag, Cu, Ni), $B_2O_3$/ZnS:(Ag, Cu, Ni), ($B_2O_3$+KCl)/ZnS:(Ag, Cu, Ni), or LiF/ZnO:Zn; the non-organic material is any of LiI:Eu, $LiI_xNa_{1-x}$:Eu, $LiCaAlF_6$:(Eu, Na), $LiSrAlF_6$:Eu, or $Li_2Se$:Ag; and the organic material is stilbene. In an exemplary embodiment, the internal scintillator is made of one of $CeF_3$, BGO, YAP:Ce or YSO:Ce. Currently, typical size of the photodetector is 10×10 mm so the internal scintillator is typically about 10×10×40 mm, although the invention is not limited to these specific dimensions.

The advantage of the detector according to the present invention over conventional solutions is that it allows to significantly improve neutron sensitivity due to the external scintillator covering the entire surface of the internal scintillator, except for the input window of the photodiode. By using a solid-state silicon photomultiplier as a photodetector, it is possible to make the gamma radiation and neutron radiation detector—and, effectively, the detector itself—smaller in size, reducing its power consumption and cost, and increasing its resistance to mechanical and magnetic impacts.

Figure 2:
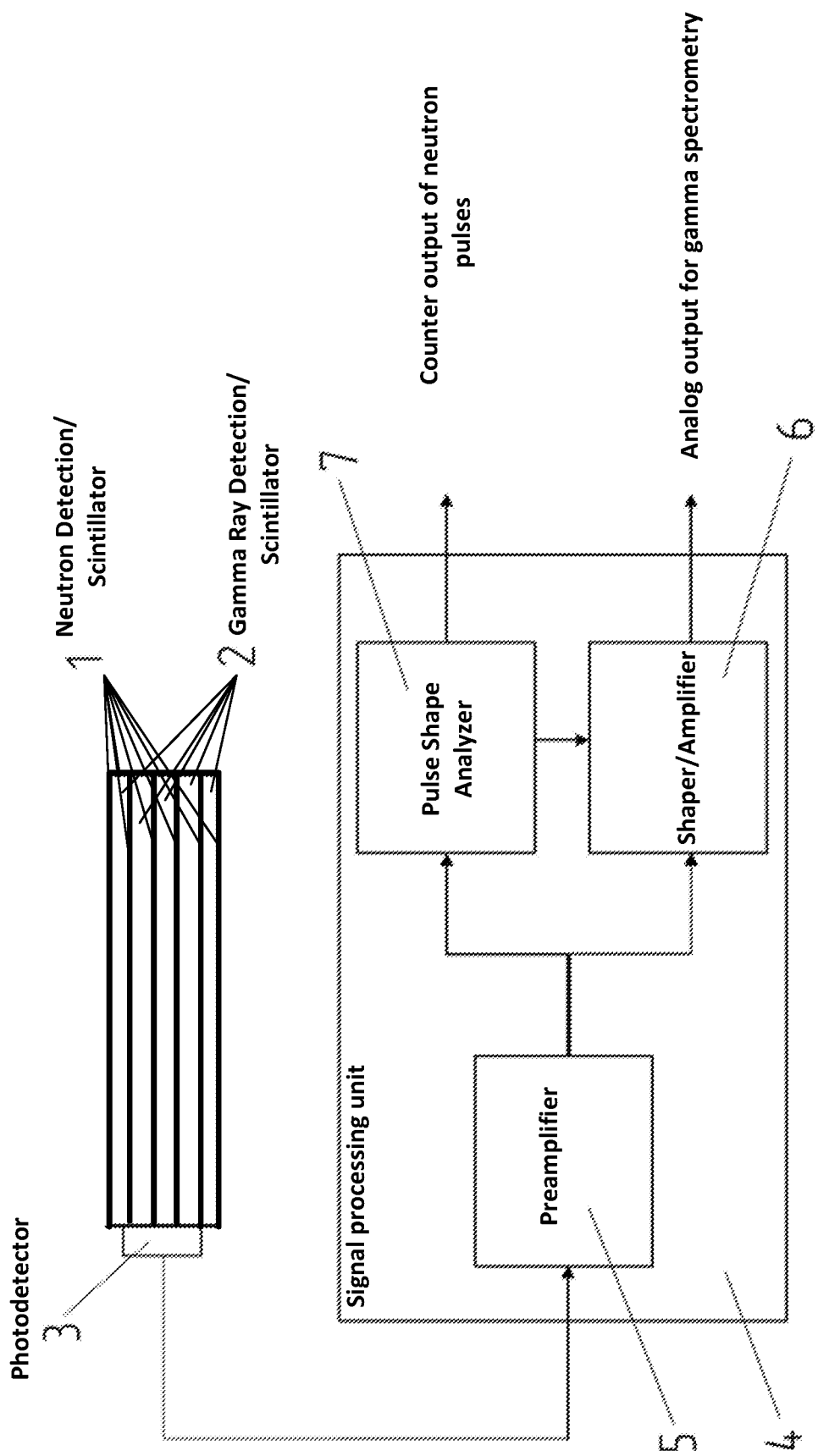
FIG. 2 illustrates an alternative embodiment of the detector of the present invention.

FIG. 2 illustrates an alternative embodiment of the detector of the present invention. In order to further increase the neutron sensitivity, the scintillators can be multi-layered. The structure looks like a sandwich built of thick sheets of a gamma scintillator covered with neutron paint/laminate/foil. All layers are stacked together and coupled to single photodetector and electronics. This structure is generally more expensive to build, but it significantly increases neutron sensitivity.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

REFERENCES (ALL INCORPORATED HEREIN BY REFERENCE IN THEIR ENTIRETY)

1. Russian Patent No. 2143711, published on Dec. 27, 1999.
2. Russian Patent No. 2189057, published on Sep. 10, 2002.
3. Russian Patent No. 2411543, published on Feb. 10, 2011.

What is claimed is:

1. A gamma radiation and neutron radiation detector comprising:
an internal scintillator made of a high atomic number material for detecting gamma radiation;
an external scintillator made of a low atomic number material that converts neutron radiation into charged particles through (n-p), (n-α), or (n-$^3$H) reactions,
the external scintillator being optically coupled to the internal scintillator and surrounding the internal scintillator completely except for one edge,
wherein the internal scintillator is in a form of a plurality of layers of the high atomic number material, the external scintillator is in a form of a plurality of thin films of low atomic number material sandwiched between the layers of the high atomic number material and surrounding all outer surfaces of outer layers of the high atomic number material, except for one edge, and
wherein the layers of the high atomic number material are in direct contact with the layers of the low atomic number material;
a solid-state silicon photomultiplier coupled to the edge, the solid-state silicon photomultiplier simultaneously registering optical signals from the external scintillator and the internal scintillator, and transforming the optical signals into electrical pulses; and
a signal processing unit receiving the electrical pulses;
wherein the signal processing unit comprises a preamplifier, a pulse shape analyzer and a spectrometric shaper/amplifier, wherein:
the preamplifier amplifies the electrical pulses from the solid-state silicon photomultiplier;
the pulse shape analyzer separates electrical pulses due to the external scintillator from electrical pulses due to the internal scintillator, and outputs a count corresponding to the neutron radiation;
the spectrometric shaper/amplifier converts the electrical pulses due to the internal scintillator into Gaussian-shaped pulses and outputs an analog signal due to the gamma radiation.

2. The detector of claim 1, wherein the external scintillator is made of a composite, an inorganic, or an organic material.

3. The detector of claim 2, wherein the composite material is any of LiF/ZnS:(Ag, Cu, Ni), $B_2O_3$/ZnS:(Ag, Cu, Ni), ($B_2O_3$+KCl)/ZnS:(Ag, Cu, Ni), or LiF/ZnO:Zn.

4. The detector of claim 2, wherein the non-organic material is any of LiI:Eu, $LiI_xNa_{(1-x)}$:Eu, $LiCaAlF_6$:(Eu, Na), $LiSrAlF_6$:Eu, or $Li_2Se$:Ag.

5. The detector of claim 2, wherein the organic material is stilbene.

6. The detector of claim 1, wherein the internal scintillator is any of $CeF_3$, BGO, YAP:Ce, or YSO:Ce.

7. The detector of claim 1, wherein the external scintillator has a thickness of up to 1 mm.

8. The detector of claim 1, wherein the external scintillator covers the internal scintillator and is shaped as a lamination, a paint or a film.

9. A gamma radiation and neutron radiation detector comprising:
a first scintillator made of a high atomic number material for detecting gamma radiation;
a second scintillator made of a low atomic number material that converts neutron radiation into charged particles through (n-p), (n-α), or (n-$^3$H) reactions,
wherein the first scintillator is in a form of a plurality of layers of the high atomic number material, the second scintillator is in a form of a plurality of thin films of low atomic number material sandwiched between the layers of the high atomic number material and surrounding all outer surfaces of outer layers of the high atomic number material, except for one edge, and wherein the layers of the high atomic number material are in direct contact with the layers of the low atomic number material;

a solid-state silicon photomultiplier coupled to the edge, the solid-state silicon photomultiplier simultaneously registering optical signals from the external scintillator and the internal scintillator, and transforming the optical signals into electrical pulses; and a signal processing unit receiving the electrical pulses;

wherein the signal processing unit comprises a preamplifier, a pulse shape analyzer and a spectrometric shaper/amplifier, and wherein:

the preamplifier amplifies the electrical pulses from the solid-state silicon photomultiplier;

the pulse shape analyzer separates electrical pulses due to the second scintillator from electrical pulses due to the first scintillator, and outputs a count corresponding to the neutron radiation;

the spectrometric shaper/amplifier converts the electrical pulses due to the first scintillator into Gaussian-shaped pulses and outputs an analog signal due to the gamma radiation.

10. The detector of claim 9, wherein the second scintillator is made of a composite, an inorganic, or an organic material.

11. The detector of claim 10, wherein the composite material is any of LiF/ZnS:(Ag, Cu, Ni), $B_2O_3$/ZnS:(Ag, Cu, Ni), ($B_2O_3$+KCl)/ZnS:(Ag, Cu, Ni), or LiF/ZnO:Zn.

12. The detector of claim 10, wherein the non-organic material is any of LiI:Eu, $LiI_xNa_{(x-1)}$:Eu, $LiCaAlF_6$:(Eu, Na), $LiSrAlF_6$:Eu, or $Li_2Se$:Ag.

13. The detector of claim 10, wherein the organic material is stilbene.

14. The detector of claim 9, wherein the first scintillator is any of $CeF_3$, BGO, YAP:Ce, or YSO:Ce.

15. The detector of claim 9, wherein the second scintillator has a thickness of up to 1 mm.

16. The detector of claim 9, wherein the second scintillator covers the first scintillator and is shaped as a lamination, a paint or a film.

* * * * *